United States Patent
Randall et al.

(10) Patent No.: US 10,911,437 B2
(45) Date of Patent: Feb. 2, 2021

(54) DETECTION OF ANOMALOUS AUTHENTICATION ATTEMPTS IN A CLIENT-SERVER ARCHITECTURE

(71) Applicant: CERNER INNOVATION, INC., Kansas City, KS (US)

(72) Inventors: Matthew Allen Randall, Kansas City, MO (US); Thomas Reaves Boettcher, Overland Park, KS (US)

(73) Assignee: CERNER INNOVATION, INC, Kansas City, KS (US)

( * ) Notice: Subject to any disclaimer, the term of this patent is extended or adjusted under 35 U.S.C. 154(b) by 18 days.

(21) Appl. No.: 14/933,777

(22) Filed: Nov. 5, 2015

(65) Prior Publication Data

US 2017/0134362 A1 May 11, 2017

(51) Int. Cl.
*G06F 7/04* (2006.01)
*H04L 29/06* (2006.01)

(52) U.S. Cl.
CPC ........ *H04L 63/083* (2013.01); *H04L 63/1425* (2013.01)

(58) Field of Classification Search
CPC ....... G06F 21/31; G06F 21/36; H04L 63/083; H04L 29/06782
USPC .......................................................... 726/7
See application file for complete search history.

(56) References Cited

U.S. PATENT DOCUMENTS

| | | | | |
|---|---|---|---|---|
| 8,776,190 B1* | 7/2014 | Cavage | ................... | G06F 21/62 380/255 |
| 8,904,506 B1* | 12/2014 | Canavor | ................. | G06F 17/30 713/182 |
| 9,148,424 B1* | 9/2015 | Yang | ................... | H04L 63/1416 |
| 2004/0225681 A1* | 11/2004 | Chaney | ............. | G06F 17/30017 |
| 2006/0037064 A1* | 2/2006 | Jeffries | ................... | G06F 21/31 726/4 |
| 2006/0101279 A1* | 5/2006 | Akita | .................... | G06F 21/608 713/184 |

(Continued)

OTHER PUBLICATIONS

Song et al, Behavior-Based Network Traffic Synthesis, IEEE, 2011, pp. 338-344.*

(Continued)

*Primary Examiner* — Alexander Lagor
*Assistant Examiner* — Jenise Jackson
(74) *Attorney, Agent, or Firm* — Shook, Hardy & Bacon L.L.P.

(57) ABSTRACT

Computerized systems and methods facilitate detection of anomalous activity during the authentication of login attempts. When a login attempt is made, credentials (e.g., a username and password) are provided. A function call is made to check for anomalous activity. A count of unique usernames attempted during a given time period is compared against a unique username threshold. In some embodiments, a count of login attempts for the current username is also compared against a login attempt threshold. If either (or both) threshold is met or exceeded, an abnormal state is returned, and one or more enhanced authentication requirements are invoked. Alternatively, a normal state is returned, and the credentials are validated. If the login attempt is successful, the username is removed from consideration for anomalous activities checks for other login attempts.

17 Claims, 7 Drawing Sheets

(56) References Cited

U.S. PATENT DOCUMENTS

| | | | | |
|---|---|---|---|---|
| 2007/0005985 | A1* | 1/2007 | Eldar | G06Q 20/206 713/183 |
| 2007/0067627 | A1* | 3/2007 | Dokuni | G06F 21/31 713/168 |
| 2007/0118653 | A1* | 5/2007 | Bindal | H04L 47/10 709/226 |
| 2008/0046750 | A1* | 2/2008 | Fletcher | G06F 21/34 713/185 |
| 2008/0228721 | A1* | 9/2008 | Wahl | G06F 21/316 |
| 2009/0002769 | A1* | 1/2009 | Keisaku | H04N 1/00127 358/401 |
| 2009/0089866 | A1* | 4/2009 | Yato | G06F 21/6218 726/6 |
| 2010/0036792 | A1* | 2/2010 | Sawada | G10L 17/10 706/52 |
| 2011/0167440 | A1* | 7/2011 | Greenfield | H04L 63/102 725/25 |
| 2011/0205578 | A1* | 8/2011 | Gouda | G06F 3/1222 358/1.15 |
| 2012/0109985 | A1* | 5/2012 | Chandrasekaran | G06F 17/30584 707/754 |
| 2012/0149337 | A1* | 6/2012 | Singh | H04L 63/102 455/411 |
| 2013/0219461 | A1* | 8/2013 | Esaki | H04L 63/08 726/1 |
| 2014/0058730 | A1* | 2/2014 | Costa | G10L 15/265 704/235 |
| 2014/0089006 | A1* | 3/2014 | Abreu | G06K 7/10861 705/3 |
| 2014/0317178 | A1* | 10/2014 | Purpura | H04L 63/10 709/203 |
| 2015/0213238 | A1* | 7/2015 | Farha | G06F 21/10 726/30 |
| 2016/0173485 | A1* | 6/2016 | Popoveniuc | G06F 21/316 726/1 |
| 2016/0226853 | A1* | 8/2016 | Wall | H04L 63/083 |
| 2016/0274839 | A1* | 9/2016 | Ohguro | G06F 3/1238 |
| 2016/0294785 | A1* | 10/2016 | Lim | G06F 21/6209 |
| 2016/0316105 | A1* | 10/2016 | Nuggehalli | G06F 21/554 |
| 2016/0371347 | A1* | 12/2016 | Aronovich | G06F 16/1748 |

OTHER PUBLICATIONS

Myers et al, Practice and Prevention of Home-Router Mid-Stream Injection Attacks, IEEE, 2008, pp. 1-14.*

Kanneh et al, Using Publicly Known Passwords with Haptics and Biometrics User Verification, IEEE, 2012, pp. 559-562.*

Liou et al, A Feasible and Cost Effective Two-Factor Authentication for Online Transactions, IEEE, 2010, pp. 47-51.*

* cited by examiner

DETECTION OF ANOMALOUS AUTHENTICATION ATTEMPTS IN A CLIENT-SERVER ARCHITECTURE

BACKGROUND

When providing authentication systems that are exposed to the public Internet, a number of threats must be addressed. One, in particular, is the threat of a brute force attack against users' passwords. The Open Web Application Security Project (OWASP) asserts that such authentication systems should protect against user enumeration (i.e., the identification of usernames) as part of its controls to protect against brute force attacks. The ability to detect and prevent both user enumeration and brute force attacks are critical to ensuring sufficient security controls are in place for many applications.

To protect against user enumeration, industry standards in the past recommended implementing login failure messages that revealed no information about whether an account was real. However, this methodology causes usability issues with some authentication systems. In particular, when a user's account becomes locked-out (e.g., due to too many failed login attempts), this method required that the system not inform the user. Otherwise, this information could be used to determine which usernames were possible to lock-out and therefore valid usernames.

Additionally, previous mechanisms used to protect against user enumeration only slow brute force attacks and do not detect them. Separate controls, generally implemented at the network layer or web server using a "Security, Incident, and Event Management" (SIEM) tool have been used to detect spikes in the quantity of overall traffic, which was used as a litmus test for determining if such brute force attacks were occurring. Such methodologies, however, were generally not standardized, automated, and resulted both in false positives and false negatives for detecting actual attacks.

BRIEF SUMMARY

Embodiments of the present invention generally relate to computerized systems and methods that facilitate the detection of anomalous activity during the authentication of login attempts. When a login attempt is made, credentials (e.g., a username and password) are provided. A function call is made to check for anomalous activity. A count of unique usernames attempted during a given time period is compared against a unique username threshold. In some embodiments, a count of login attempts for the current username is also compared against a login attempt threshold. If the count of unique usernames satisfies the unique username threshold and/or the count of login attempts for the current username satisfies the login attempt threshold (if considered), an abnormal state is returned, and one or more enhanced authentication requirements are invoked. Alternatively, a normal state is returned, and the credentials are validated. If the login attempt is successful, the username is removed from consideration for anomalous activities checks for other login attempts. This allows the anomalous activity detection process to be self-healing in that login attempts that are ultimately successful are removed from consideration.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
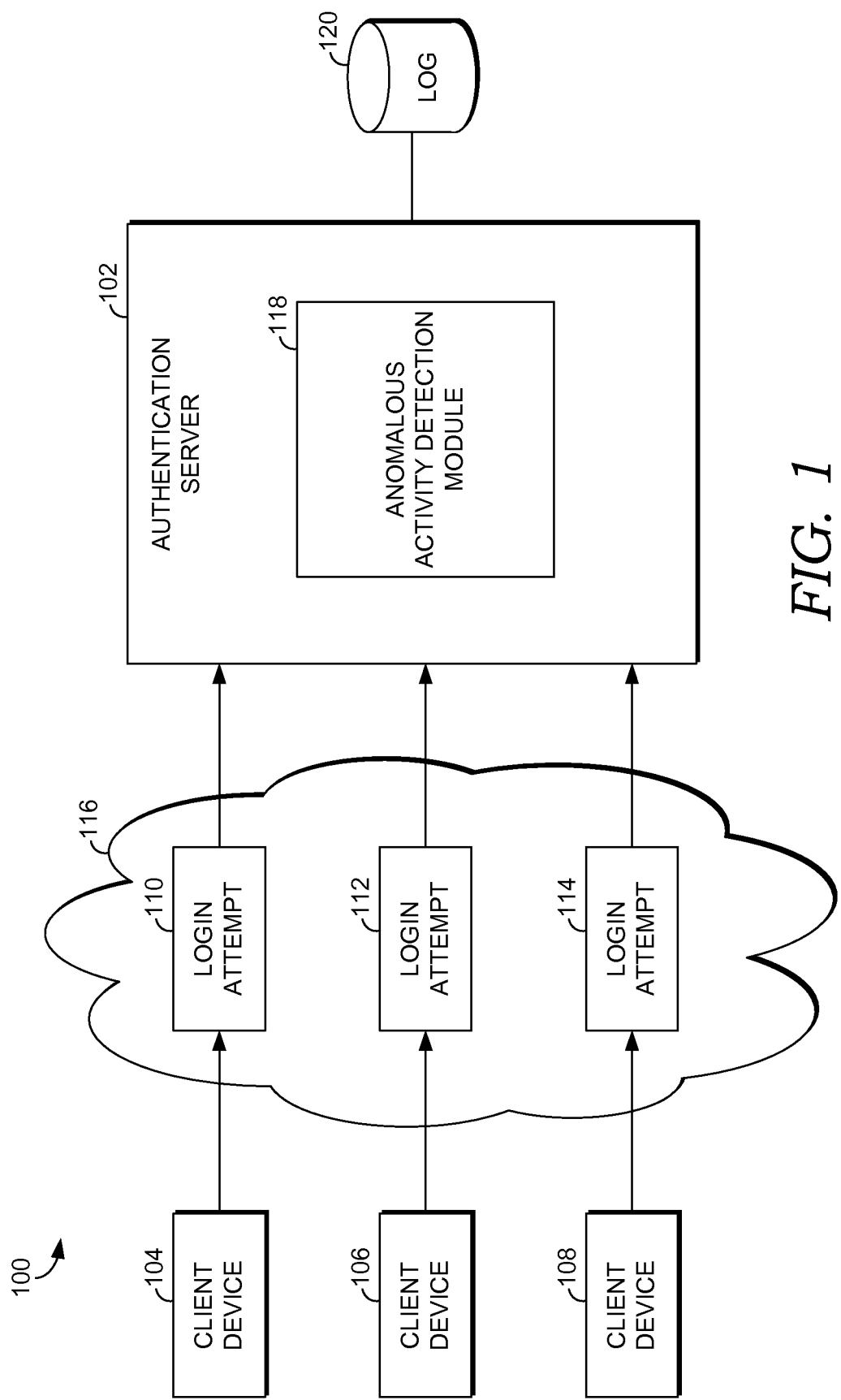
FIG. 1 is a block diagram of an exemplary system architecture in which embodiments of the invention may be employed.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Embodiments of the present invention are generally directed to computerized methods and systems that facilitate the detection of anomalous authentication activity in a client-server architecture. When a login attempt is made, credentials (e.g., a username and password) are provided. A function call is made to check for anomalous authentication activity. A count of unique usernames attempted during a given time period is determined. For instance, a log of unique usernames attempted may be maintained to determine that count. Each time a unique username is attempt, the unique username is added to the log. Whether each username is legitimate is not considered when adding the username to the log. The count of unique usernames is compared against a unique username threshold. In some embodiments, a count of login attempts for the current username is also maintained and compared against a login attempt threshold. If the count of unique usernames satisfies the unique username threshold and/or the count of login attempts for the current username satisfies the login attempt threshold (if considered), an abnormal state is returned, and one or more enhanced authentication requirements are invoked. Alternatively, a normal state is returned, and the credentials are validated. If the login attempt is successful, the username is removed from consideration for anomalous activities checks for other login attempts. This allows the anomalous activity detection process to be self-healing in that login attempts that are ultimately successful are removed from consideration.

Traditional solutions use methods such as counting the quantity of login activity, counting the number of actual user accounts that have failed log-ins, and/or counting the number of total log-in failures. The methodology in embodiments of the present invention, among other things, instead analyze unique usernames attempted during a given time period without consideration of whether those usernames are legitimate. Generally, the methods described herein consider "abandoned sessions" (authentication attempts for distinct usernames that were not followed by a subsequent successful authentication for the usernames). As such, embodiments of the present invention provide a number of advantages over traditional authentication solutions. Attempts at brute force/user enumeration are effectively detected as an attempted attacker will quickly accumulate login attempts for numerous distinct user identifiers, but such attempted logins are not successful. Repeated failures for a single user account (incorrect username or incorrect password) will not trigger enhanced authentication requirements that would be applied to all accounts. A surge of authentication failures by legitimate users (e.g., a large group of new users inexperienced in typing their passwords) who then proceed to authenticate successfully will not accidentally trigger enhanced authentication requirements that would be applied to all accounts. The solutions described herein do not need to know which usernames are legitimate to function. This characteristic intrinsically protects against user enumeration attacks and eliminates the potential for implementation bugs in this respect. The solutions are "self-correcting" or "self-healing"—as failed attempts are removed from the count over time or when a user successfully authenticates, the system will eventually return to normal once under the unique username threshold. By recording an authentication attempt first, then counting the total, the detection methodology intrinsically prevents a massively distributed attack that could bypass protection mechanisms used by traditional solutions. Synchronization of access facilitates an accurate event record (e.g., for auditing purposes) and allows user interface messages to be more descriptive. In embodiments in which both a unique username threshold and login attempt threshold are used in conjunction, an attacker cannot determine whether an enhanced authentication requirement is invoked by global login attempts or login attempts for a given username, thereby prevent the attacker from determining whether a username is valid.

Referring to the drawings in general, and initially to FIG. 1, a block diagram is provided illustrating an exemplary system 100 in which some authentication embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 100 includes an authentication server 102 that operates to authenticate login attempts from any number of client devices, such as the login attempts 110, 112, 114 from the client devices 104, 106, 108, respectively. The authentication server 102 authenticates login attempts to permit only authorized access to a restricted resource (not shown), such as a computer system, computer service, data store, etc., which may be local to or remote from the authentication server 102. In some implementations, login attempts are received at the authentication server 102 over a network, such as the network 116, directly from user devices. In other implementations, login attempts are indirectly provided to the authentication server 102. For example, a login attempt may be received at a front-end component of a restricted resource, which forwards the login attempt to the authentication server 102 for authentication purposes, and the authentication server 102 returns an indication of whether the login attempt is authorized. Any and all variations and combinations thereof are considered to be within the scope of embodiments herein.

It should be understood that the system 100 shown in FIG. 1 is an example of one suitable computing system architecture. Each of the components shown in FIG. 1 may be implemented via any type of computing device, such as computing device 600 described with reference to FIG. 6, for example. The components may communicate with each other via a network 116 may include, without limitation, one or more local area networks (LANs) and/or wide area networks (WANs). Such networking environments are commonplace in offices, enterprise-wide computer networks, intranets, and the Internet. It should be understood that any number of authentication systems and user devices may be employed within the system 100 within the scope of the present invention. Each may comprise a single device or multiple devices cooperating in a distributed environment. For instance, the authentication server 102 may be provided via multiple devices arranged in a distributed environment that collectively provide the functionality described herein. Additionally, other components not shown may also be included within the network environment.

When a login attempt from a client device occurs, the authentication server 102 receives user credentials. The user credentials may include a username (any identifier for the user), along with a password (any information known to the user and used as proof that the claimant is the owner of the username, such as a word, phrase, access code, PIN, etc.) or other credential component (e.g., physical object, such as a card, key, USB stick, etc.; or user's physical characteristic, such as biometrics).

Upon receiving the user credentials, the authentication server 102 invokes a function provided by an anomalous activity detection module 118. Using the username as an input, the anomalous activity detection module 118 determines whether there is anomalous authentication activity globally (i.e., for all unique usernames attempted). To detect anomalous authentication activity globally, the anomalous activity detection module 118 determines a count of unique usernames from login attempts over a time period, which is configurable (e.g., hour, 8 hours, 24 hours, etc.). In various embodiments, the time period may be fixed (e.g., begins at 12 am on day 1 and ends at 12 am on day 2), or the time period may be rolling (e.g., the last 24 hours from the current time). The count of unique usernames is compared against a unique username threshold. If the count of unique usernames satisfies (e.g., meets or exceeds) the unique username threshold, an abnormal state is returned, indicating an online guessing attack may be occurring. Otherwise, a normal state is returned.

In some embodiments, in conjunction with determining anomalous authentication activity globally, the anomalous activity detection module 118 also determines whether there is anomalous activity for the username from the current login attempt. In particular, a count of login attempts with the username over a time period is maintained. This time period is configurable, may be fixed or rolling, and may be the same or different from the time period used for the global anomalous activity detection. The count of login attempts for the username is compared against a login attempt threshold. In such embodiments, an abnormal state is returned if the count of unique usernames satisfies the unique username threshold and/or the count of login attempts for the current username exceeds the login attempt threshold. As such, a normal state is returned in such embodiments only if neither threshold is satisfied.

Once the state (i.e., either abnormal or normal) is determined, the anomalous activity detection module 118 returns this information about the current state. If the anomalous activity detection module 118 returns a normal state, authentication using the credentials proceeds as usual. Alternatively, if the anomalous activity detection module 118 returns an abnormal state, the authentication server 102 invokes one or more enhanced authentication requirements to counter-measure against the possible online guessing attack. Such enhanced authentication requirements could include, but are not limited to, CAPTCHAs, rate limitations, disablement of password-based authentication, password reset, etc. In some embodiments, each time a check results in a state transition from a normal state to an abnormal state, an alarm is logged to alert system administrators of the possibility of an online attack.

If the login attempt is successfully authenticated (either using enhanced authentication requirements under an abnormal state or via authentication using the credentials under a normal state), the authentication server 102 makes a second function call to remove login attempts associated with the authenticated username from anomalous activity consideration. This would remove the record of the username that was successfully authenticated. Such a reset could also remove records of user identifiers similar to the one successfully authenticated, such as those with transposed letters, or having a similarity as determined by another matching algorithm. Removal of a record may include deleting the record from the log 120, flagging or unflagging the record, or any other approach that would remove the record from consideration of anomalous activity detection.

The anomalous activity detection module 118 may track username usage in a variety of different manners within the scope of embodiments of the present invention. In some confirmations, the anomalous activity detection module 118 tracks username usage by persisting a record for each username attempted in a log 120. Persistence may be performed, for instance, by any persistence system that offers atomic operations, such as a relational database, or a file system. In some configurations, a timestamp is also recorded to reflect when a login attempt occurred. The timestamp may be updated upon subsequent login attempts for each username. In some configurations, a count of login attempts is also maintained for each username. Accordingly, when a subsequent login attempt within a relevant time period occurs, the count for the username is incremented. In configurations in which a rolling time period is used, a timestamp may be recorded for each login attempt to allow for the count to be decremented when login attempts fall outside of the rolling time period. For instance, a background process may execute on a scheduled or other basis, removing instances of login attempts whose age (based on the timestamp recorded with the username) exceeds a configured interval. This ensures that login attempts are not counted in perpetuity; only attempts within the defined time period are considered for determining if the system is under attack.

In some embodiments, the count of unique usernames used to detect global anomalous activity includes only a single count for each unique username attempted during the time period. For instance, in configurations in which a record is persisted for each username, the count of unique usernames is determined by simply counting the total number of records. In other embodiments, the count of unique usernames is a sum of the number of times each unique username was attempted during the time period (i.e., the sum of the count of login attempts for all usernames). For instance, suppose 100 unique usernames were each attempted three times. In the first embodiment, the count of unique usernames would be 100; while in the second embodiment, the count of unique usernames would be 300.

Detection of global anomalous activity using the unique username threshold serves two primary purposes: to immediately and automatically defend the system from short-term malicious activity (such as account enumeration or wide-targeted password guessing); and to alert human administrators of the anomaly so that they may take steps to prevent long-term malicious activity from a particular actor. The unique username threshold at which global protections are applied is configurable. In some embodiments, the unique username threshold is derived from empirical data about typical session abandonment rates of the system, for example by sampling the current number of authentication sessions at every hour of the day over the course of several weeks (including abandoned sessions). An "abandoned session" is defined as an authentication attempt for a distinct username that was not followed by a subsequent, successful authentication. In order to avoid bias in the model, data may be sampled during a period where no malicious activity can be identified.

Following collection of the data, a statistical model can be constructed that predicts the peak number of concurrent authentication sessions. The unique username threshold can then be chosen to be an upper percentile of this model. The particular percentile chosen may be based on an organization's tolerance for false-positives; for instance, choosing the 99.9th percentile of the model would predict less than one false positive per year.

The precise model derived may depend on usage patterns and abandoned session decay rates (i.e. the rate at which old sessions are automatically removed from the system) and may be arbitrarily complex. For systems which see consistent use from a fixed set of users, a Gaussian distribution is expected to arise. For systems with more sporadic and random use, a Poisson distribution is likely.

Figure 2:
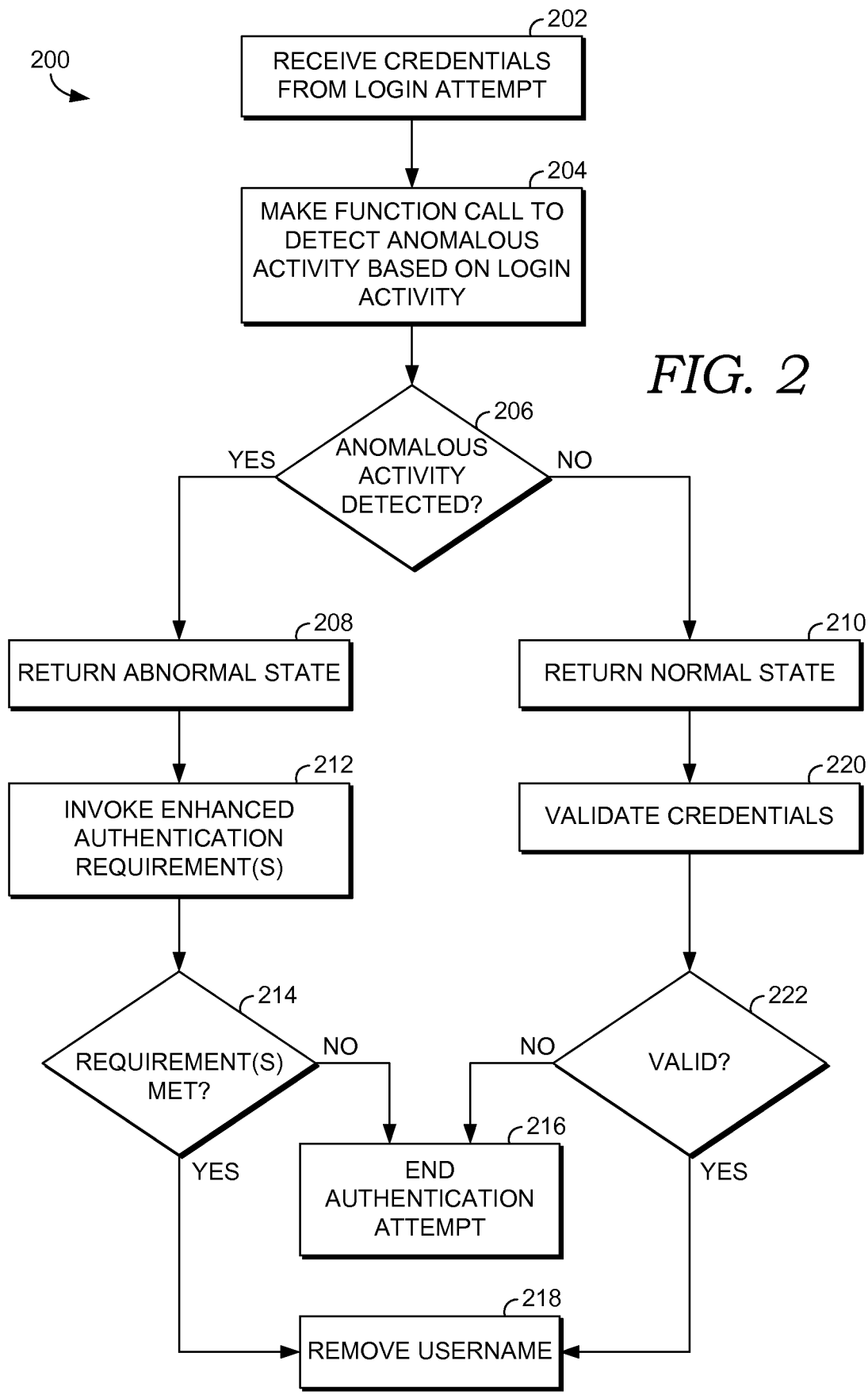
FIG. 2 is a flow diagram showing a method for authenticating a login attempt at an authentication server in accordance with an embodiment of the present invention.

Referring now to FIG. 2, a flow diagram is provided that illustrates a method 200 for authenticating a login attempt at an authentication server in accordance with an embodiment of the present invention. Each block of the method 200 and any other method discussed herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the method 200 may be performed using the authentication server 102 of FIG. 1.

Initially, as shown at block 202, credentials (including at least a username) from a login attempt being made by a client device are received at an authentication server. A function call is made to detect anomalous activity based on login activity, as shown at block 204. A determination is made regarding whether there is anomalous activity, as shown at block 206. This may be performed, for instance, using any of the methods 300, 400, and 500 discussed below with reference to FIGS. 3, 4, and 5, respectively. Either an abnormal state or normal is returned, as shown at blocks 208 and 210, respectively.

If an abnormal state is returned at block 208, one or more enhance authentication requirements are invoked, as shown at block 212. Such enhanced authentication requirements could include, but are not limited to, CAPTCHAs, rate limitations, disablement of password-based authentication, password reset, etc. Any enhanced authentication requirement invoked may be used in addition to or in lieu of authentication of the credentials. A determination is made at block 214 regarding whether the enhanced authentication requirements are met. If not, the authentication attempt ends at block 216. Alternatively, if the enhanced authentication requirements are met, the username (and any associated count of login attempts) are removed from consideration from anomalous activity detection, as shown at block 218. This could include removing a record for the username, decrementing a unique username count, and/or other approaches.

If a normal state is returned at block 210, the authentication server attempts to validate the credentials from the login attempt, as shown at block 220. A determination is made at block 222 regarding whether the credentials are valid. If not, the authentication attempt ends at block 216. Alternatively, if the credentials are successfully validated, the username (and any associated count of login attempts) are removed from consideration from anomalous activity detection, as shown at block 218. This could include removing a record for the username, decrementing a unique username count, and/or other approaches.

Figure 3:
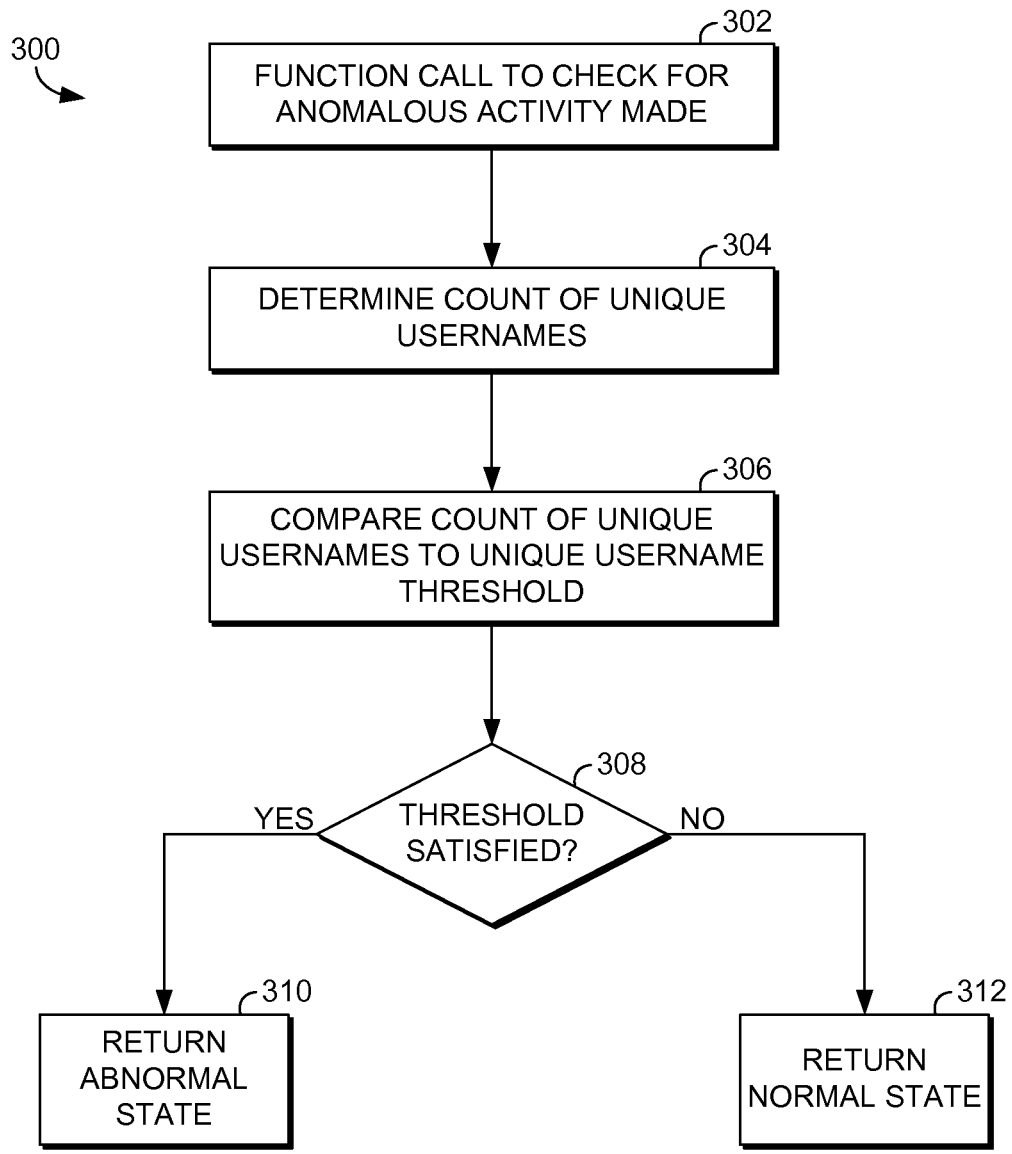
FIG. 3 is a flow diagram showing a method for detecting anomalous activity globally in accordance with an embodiment of the present invention.

Turning to FIG. 3, a flow diagram is provided showing a method 300 for detecting anomalous activity globally in accordance with some embodiments of the present invention. The method 300 may be performed, for instance, by the anomalous activity detection module 118 of FIG. 1. As shown at block 302, a function call to check for anomalous activity is made in response to a login attempt. A count of unique usernames from login attempts during a defined time period is determined, as shown at block 304. In some embodiments, the count of unique usernames includes only a single count for each unique username attempted during the time period. For instance, in configurations in which a record is persisted for each username, the count of unique usernames is determined by simply counting the total number of records. In other embodiments, the count of unique usernames is a sum of the number of times each unique username was attempted during the time period (i.e., the sum of the count of login attempts for all usernames).

The count of unique usernames is compared against a unique username threshold at block 306. A determination is made at block 308 regarding whether the count of unique usernames satisfies (e.g., meets or exceeds) the unique username threshold. If the count of unique usernames satisfies the unique username threshold, an abnormal state is returned, as shown at block 310. Alternatively, if the count of unique usernames does not satisfy the unique username threshold, a normal state is returned, as shown at block 312.

Figure 4:
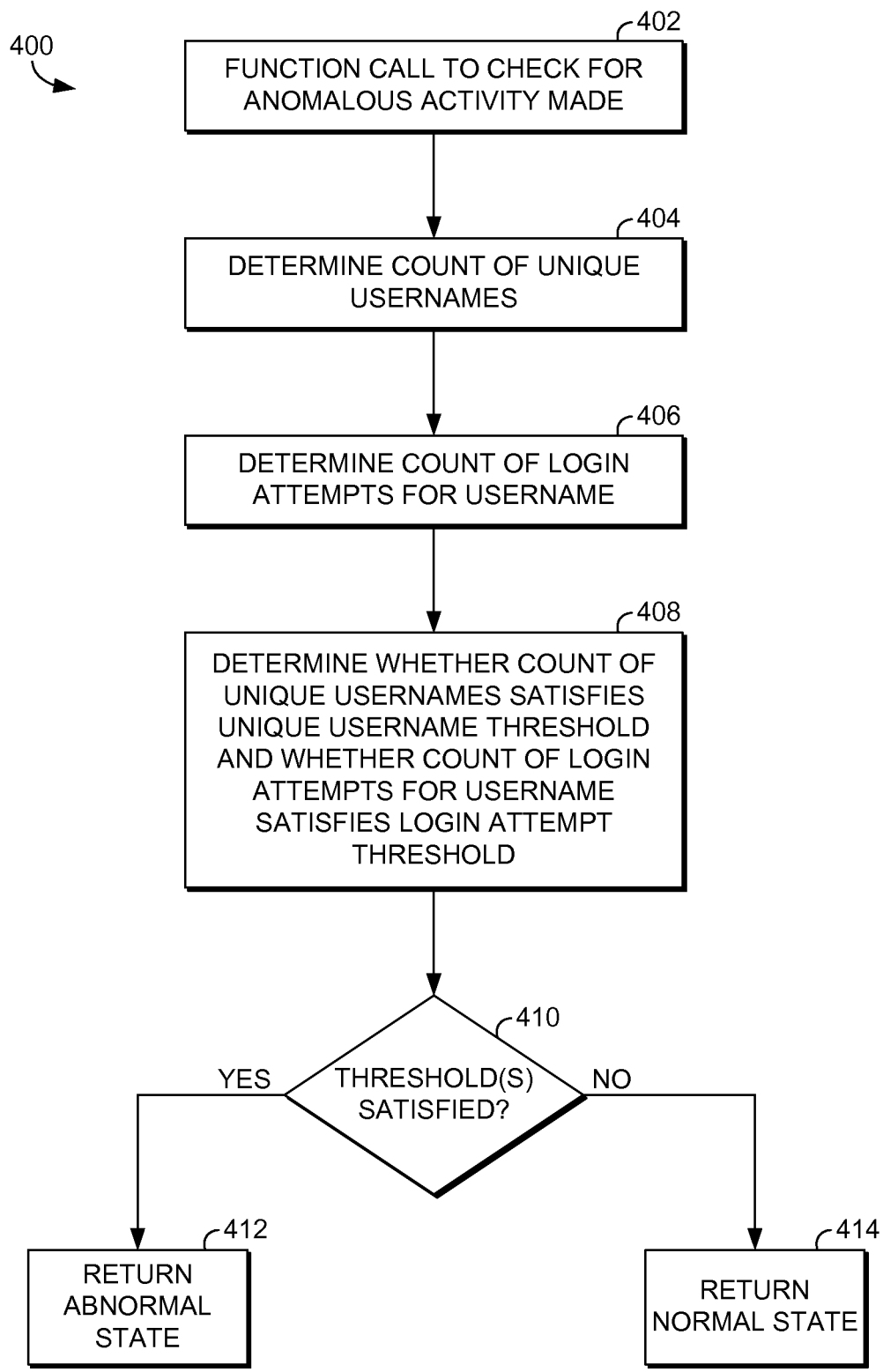
FIG. 4 is a flow diagram showing a method in which anomalous activity is checked both globally and for the username from a current login attempt in accordance with an embodiment of the present invention.

FIG. 4 provides a flow diagram of a method 400 in which anomalous activity is checked both globally and for the username from a current login attempt. The method 400 may be performed, for instance, by the anomalous activity detection module 118 of FIG. 1. As shown at block 402, a function call to check for anomalous activity is made in response to a login attempt. A count of unique usernames from login attempts during a defined time period is determined, as shown at block 404. This count may be made as described hereinabove. Additionally, a count of login attempts for the username from the current login attempt during a defined time period is determined, as shown at block 406. The time period used for the count of unique usernames and the count of login attempts for the current username may be the same or different in various embodiments.

A determination is made at block 408 regarding whether the count of unique usernames satisfies a unique username threshold and whether the count of login attempts for the current username satisfies a login attempt threshold. If it is determined at block 410 that the count of unique usernames satisfies the unique username threshold and/or the count of login attempts for the current username satisfies the login attempt threshold, an abnormal state is returned, as shown at block 412. Alternatively, if the count of unique usernames does not satisfy the unique username threshold and the count of login attempts for the current username does not satisfy the login attempt threshold, a normal state is returned, as shown at block 414.

Figure 5:
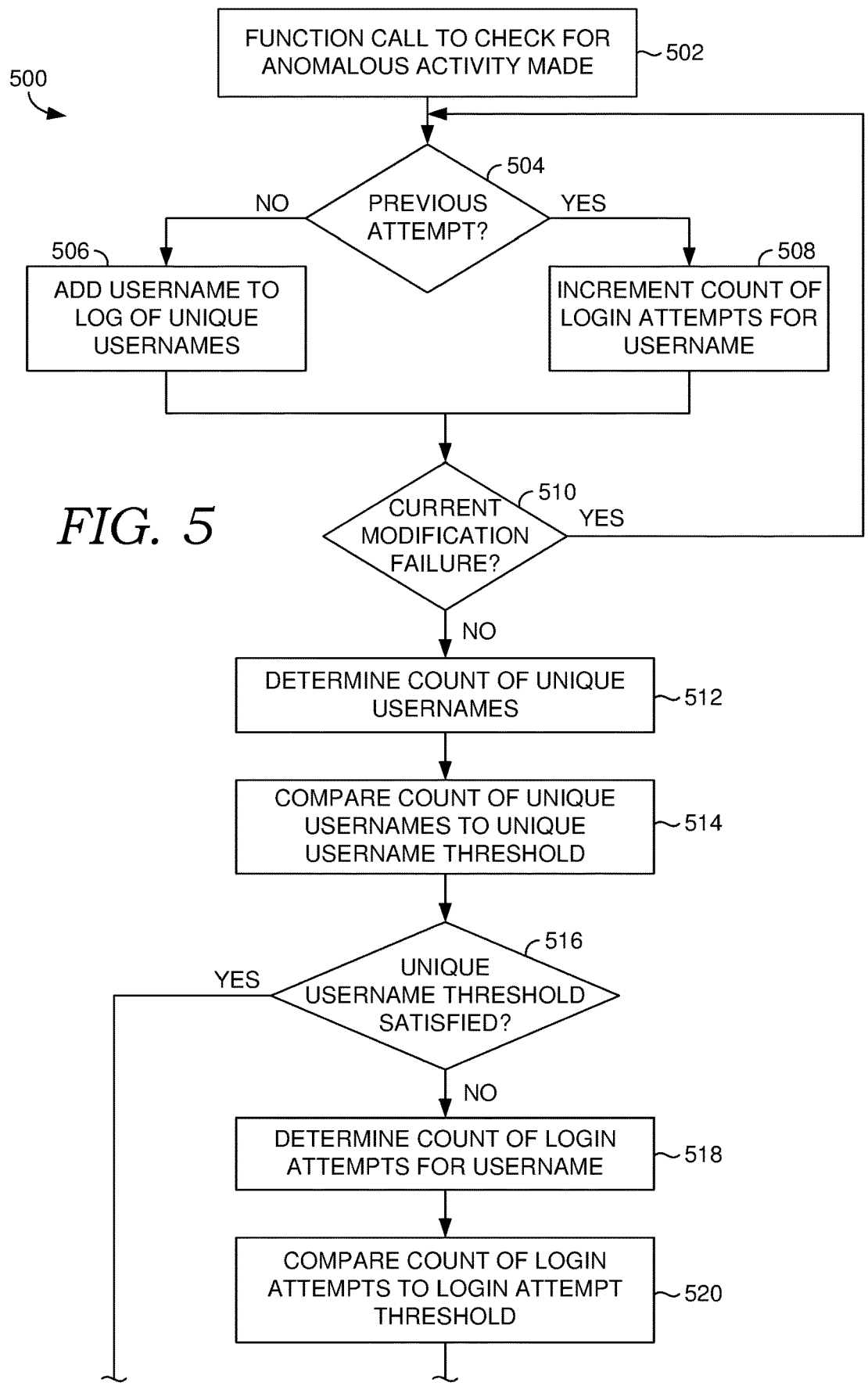
FIG. 5 is a flow diagram showing a method for in which anomalous activity is checked both globally and for the username from a current login attempt in accordance with another embodiment of the present invention.
Figure 5:
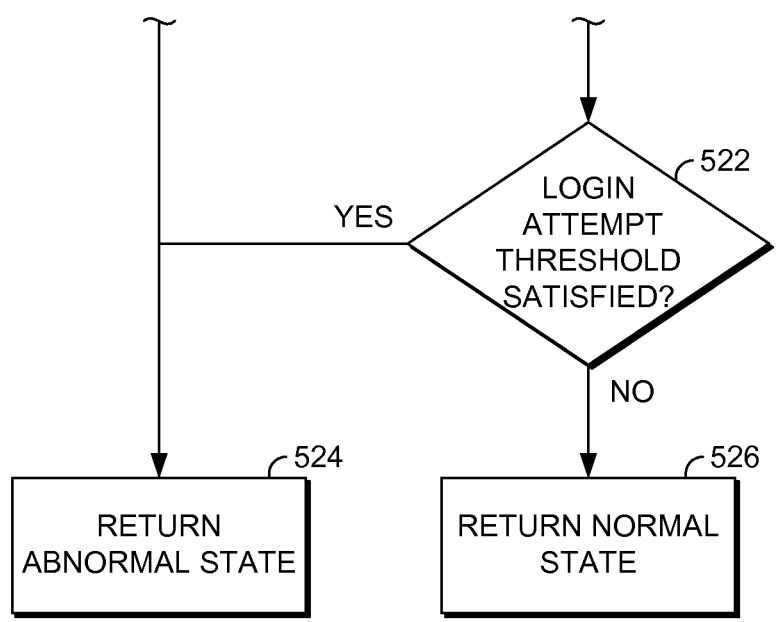

FIG. 5 provides a flow diagram of another method 500 for checking for anomalous activity both globally and for the username from a current login attempt. The method 500 may be performed, for instance, by the anomalous activity detection module 118 of FIG. 1. As shown at block 502, a function call to check for anomalous activity is made in response to a login attempt with a given username. A determination is made at block 504 regarding whether a previous login attempt with the username has occurred during a given time period. This may include checking a log to determine if a record exists for the username. If a determination is made that a previous attempt has not occurred, the username is added to a log of unique usernames, as shown at block 506, for instance by creating a record for the username. Alternatively, if a determination is made that a previous attempt has occurred, a count of login attempts for the username is incremented, as shown at block 508. Additionally, a determination of concurrent modification failure is made at block 510. If so, the process of blocks 504, 506, and 508 is repeated. This ensures that concurrent login attempts for a username are reflected in the count of login attempts for the username.

A count of unique usernames from a relevant time period is determined at block 512, and the count of unique usernames is compared against a unique username threshold at block 514. A determination is made at block 516 regarding whether the count of unique usernames satisfies a unique username threshold. Additionally, a count of login attempts for the current username is determined at block 518, and the count of login attempts for the username is compared against a login attempt threshold at block 520. A determination is made at block 522 regarding whether the count of login attempts for the username satisfies a login attempt threshold.

If the count of unique usernames satisfies the unique username threshold and/or the count of login attempts for the current username satisfies the login attempt threshold, an abnormal state is returned, as shown at block 524. Alternatively, if the count of unique usernames does not satisfy the unique username threshold and the count of login attempts for the current username does not satisfy the login attempt threshold, a normal state is returned, as shown at block 526.

Having described embodiments of the present invention, an exemplary operating environment in which embodiments of the present invention may be implemented is described below in order to provide a general context for various aspects of the present invention. The exemplary computing system environment, for instance, a medical information computing system, on which embodiments of the present invention may be implemented is illustrated and designated generally as reference numeral 600. It will be understood and appreciated by those of ordinary skill in the art that the illustrated medical information computing system environment 600 is merely an example of one suitable computing environment and is not intended to suggest any limitation as to the scope of use or functionality of the invention. Neither should the medical information computing system environment 600 be interpreted as having any dependency or requirement relating to any single component or combination of components illustrated therein.

The present invention may be operational with numerous other general purpose or special purpose computing system environments or configurations. Examples of well-known computing systems, environments, and/or configurations that may be suitable for use with the present invention include, by way of example only, personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

The present invention may be described in the general context of computer-executable instructions, such as program modules, being executed by a computer. Generally, program modules include, but are not limited to, routines, programs, objects, components, and data structures that perform particular tasks or implement particular abstract data types. The present invention may also be practiced in distributed computing environments where tasks are performed by remote processing devices that are linked through a communications network. In a distributed computing environment, program modules may be located in local and/or remote computer storage media including, by way of example only, memory storage devices.

Figure 6:
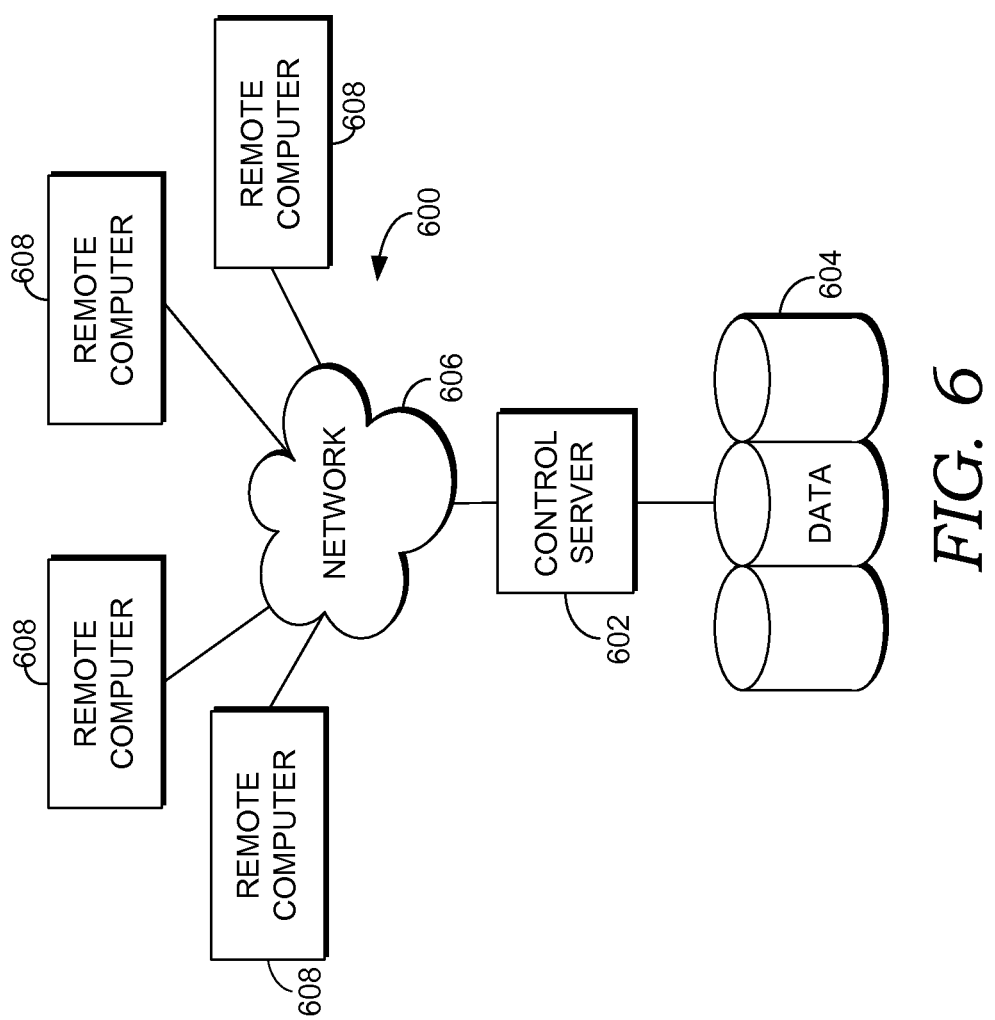
FIG. 6 is a block diagram of an exemplary computing environment suitable for use in implementing the present invention.

With continued reference to FIG. 6, the exemplary medical information computing system environment 600 includes a general purpose computing device in the form of a server 602. Components of the server 602 may include, without limitation, a processing unit, internal system memory, and a suitable system bus for coupling various system components, including database cluster 604, with the server 602. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The server 602 typically includes, or has access to, a variety of computer readable media, for instance, database cluster 604. Computer readable media can be any available media that may be accessed by server 602, and includes volatile and nonvolatile media, as well as removable and non-removable media. By way of example, and not limitation, computer readable media may include computer storage media and communication media. Computer storage media may include, without limitation, volatile and nonvolatile media, as well as removable and nonremovable media implemented in any method or technology for storage of information, such as computer readable instructions, data structures, program modules, or other data. In this regard, computer storage media may include, but is not limited to, RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the server 602. Computer storage media does not comprise signals per se. Communication media typically embodies computer readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer readable media.

The computer storage media discussed above and illustrated in FIG. 6, including database cluster 604, provide storage of computer readable instructions, data structures, program modules, and other data for the server 602.

The server 602 may operate in a computer network 606 using logical connections to one or more remote computers 608. Remote computers 608 may be located at a variety of locations in a medical or research environment, for example, but not limited to, clinical laboratories, hospitals and other inpatient settings, veterinary environments, ambulatory settings, medical billing and financial offices, hospital administration settings, home health care environments, and clinicians' offices. Clinicians may include, but are not limited to, a treating physician or physicians, specialists such as surgeons, radiologists, cardiologists, and oncologists, emergency medical technicians, physicians' assistants, nurse practitioners, nurses, nurses' aides, pharmacists, dieticians, microbiologists, laboratory experts, genetic counselors, researchers, veterinarians, students, office assistants and the like. The remote computers 608 may also be physically located in non-traditional medical care environments so that the entire health care community may be capable of integration on the network. The remote computers 608 may be personal computers, servers, routers, network PCs, peer devices, other common network nodes, or the like, and may include some or all of the components described above in relation to the server 602. The devices can be personal digital assistants or other like devices.

Exemplary computer networks 606 may include, without limitation, local area networks (LANs) and/or wide area networks (WANs). Such networking environments are commonplace in offices, enterprise-wide computer networks, intranets, and the Internet. When utilized in a WAN networking environment, the server 602 may include a modem or other means for establishing communications over the WAN, such as the Internet. In a networked environment, program modules or portions thereof may be stored in the server 602, in the database cluster 604, or on any of the remote computers 608. For example, and not by way of limitation, various application programs may reside on the memory associated with any one or more of the remote computers 608. It will be appreciated by those of ordinary skill in the art that the network connections shown are exemplary and other means of establishing a communications link between the computers (e.g., server 602 and remote computers 608) may be utilized.

In operation, a user may enter commands and information into the server 602 or convey the commands and information to the server 602 via one or more of the remote computers 608 through input devices, such as a keyboard, a pointing device (commonly referred to as a mouse), a trackball, or a touch pad. Other input devices may include, without limitation, microphones, satellite dishes, scanners, or the like. Commands and information may also be sent directly from a remote healthcare device to the server 602. In addition to a monitor, the server 602 and/or remote computers 608 may include other peripheral output devices, such as speakers and a printer.

Although many other internal components of the server 602 and the remote computers 608 are not shown, those of ordinary skill in the art will appreciate that such components and their interconnection are well known. Accordingly, additional details concerning the internal construction of the server 602 and the remote computers 608 are not further disclosed herein.

As can be understood, embodiments of the present invention provide a system for detecting anomalous authentication activity in a client-server architecture. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated and within the scope of the claims.

What is claimed is:

1. One or more computer storage media storing computer-useable instructions that, when used by one or more computing devices, cause the one or more computing devices to perform operations comprising:
   maintaining a log to detect anomalous activity based on login activity of unique usernames including unique usernames that are legitimate or not legitimate, wherein a legitimate username is associated with a user account, wherein each login attempt of a unique username adds the unique username received in the login attempt to the log and increments a count of unique usernames, and wherein a legitimacy of the unique username is not considered when adding the unique username to the log;
   receiving, at an authentication server, credentials including a username from a login attempt being made by a client device;
   determining the count of unique usernames from a plurality of login attempts within a given time period by retrieving information from the log;
   determining whether the count of unique usernames in the log from the plurality of login attempts within the given time period satisfies a unique username threshold;
   in response to the count of unique usernames in the log satisfying the unique username threshold, invoking one or more enhanced authentication requirements for the login attempt;
   in response to the count of unique usernames not satisfying the unique username threshold, validating the credentials without requiring the one or more enhanced authentication requirements;
   determining whether the login attempt has been successfully authenticated;
   in response to the login attempt having been successfully authenticated, decrementing the count of unique usernames by removing the unique username including unique usernames that are similar to the unique username received in the successfully authenticated login attempt from the log of unique usernames received from login attempts, wherein the unique usernames that are similar to the unique username include those with transposed letters, or having a similarity as determined by a matching algorithm; and
   in response to the login attempt having not been successfully authenticated, maintaining the count of unique usernames by maintaining the unique username within the log of unique usernames received from login attempts.

2. The one or more computer storage media of claim 1, wherein the count of unique usernames from the plurality of login attempts includes a single count per unique username.

3. The one or more computer storage media of claim 1, wherein the count of unique usernames from the plurality of login attempts includes a sum of login attempts for each unique username.

4. The one or more computer storage media of claim 1, wherein the given time period is a rolling time period.

5. The one or more computer storage media of claim 1, wherein the username is removed by deleting tie a record of username from the log.

6. A system comprising:
   one or more processors; and
   one or more computer storage media storing computer-useable instructions that, when used by the one or more processors, cause the one or more processors to:
   maintain a log to detect anomalous activity based on login activity of unique usernames, wherein each login attempt of a unique username increments a count of unique usernames;
   receive at an authentication server, credentials including a username from a login attempt being made by a client device;
   determine whether a count of unique usernames from a plurality of login attempts within a first time period satisfies a unique username threshold by retrieving information from the log and whether a count of login attempts for the username within a second time period satisfies a login attempt threshold;
   in response to the count of unique usernames in the log satisfying the unique username threshold and/or the count of login attempts for the username satisfying the login attempt threshold, invoke one or more enhanced authentication requirements for the login attempt;

in response to the count of unique usernames in the log not satisfying the unique username threshold and the count of login attempts for the username not satisfying the login attempt threshold, validate the credentials without requiring the one or more enhanced authentication requirements;

determine whether the login attempt has been successfully authenticated;

in response to the login attempt having been successfully authenticated, decrement the count of unique usernames by removing a unique username including unique usernames that are similar to the unique username received in the successfully authenticated login attempt from the log of unique usernames received from login attempts, wherein the unique usernames that are similar to the unique username include those with transposed letters, or having a similarity as determined by a matching algorithm; and in response to the login attempt having not been successfully authenticated, maintain the count of unique usernames by maintaining the unique username within the log of unique usernames received from login attempts.

7. The system of claim 6, wherein the first time period and the second time period are the same.

8. The system of claim 6, wherein the count of unique usernames from the plurality of login attempts within the first time period includes a single count per unique username.

9. The system of claim 6, wherein the count of unique usernames from the plurality of login attempts within the first time period includes a sum of login attempts for each unique username.

10. The system of claim 6, wherein the count of unique usernames is decreased by removing a record for the username from the log of unique usernames.

11. The system of claim 6, wherein the instructions further cause the one or more processors to: reset the count of login attempts for the username to zero based on determining that the login attempt has been successfully authenticated.

12. A computer-implemented method performed by an authentication server in a server-client environment, the method comprising:

maintaining a log to detect anomalous activity based on login activity of unique usernames, wherein each login attempt of a unique username increments a count of unique usernames;

receiving, at the authentication server, credentials including a username from a login attempt submitted by a client device;

determining whether a previous login attempt with the username has occurred during a time period;

in response to determining a previous login attempt with the username has not occurred during the time period, adding the username to the log of unique usernames;

in response to determining a previous login attempt with the username has occurred during the time period, incrementing a count of login attempts for the username;

determining whether the count of unique usernames from the log satisfies a unique username threshold and whether the count of login attempts for the username satisfies a login attempt threshold;

in response to the count of unique usernames from the log satisfying the unique username threshold and/or the count of login attempts for the username satisfying the login attempt threshold, invoking one or more enhanced authentication requirements; and in response to the count of unique usernames from the log not satisfying the unique username threshold and the count of login attempts for the username not satisfying the login attempt threshold, validating the credentials for the login attempt;

determining whether the login attempt has been successfully authenticated;

in response to the login attempt having been successfully authenticated, decrementing the count of unique usernames by removing the unique username including unique usernames that are similar to the unique username received in the successfully authenticated login attempt from the log of unique usernames received from login attempts, wherein the unique usernames that are similar to the unique username include those with transposed letters, or having a similarity as determined by a matching algorithm; and in response to the login attempt having not been successfully authenticated, maintaining the count of unique usernames by maintaining the unique username within the log of unique usernames received from login attempts.

13. The method of claim 12, wherein the log comprises a database, and wherein adding the username to the log comprises adding a new database record for the username to the database.

14. The method of claim 12, wherein the count of unique usernames from the log includes a single count per unique username.

15. The method of claim 12, wherein the count of unique usernames from the log includes a sum of login attempts for each unique username.

16. The method of claim 12, wherein removing the username from the log comprises deleting a record for the username from the log.

17. The method of claim 12, wherein removing the username from the log comprises unflagging a record for the username from the log.

\* \* \* \* \*